(12) United States Patent
Takaki et al.

(10) Patent No.: US 6,784,914 B2
(45) Date of Patent: Aug. 31, 2004

(54) CLOCK-GENERATING CIRCUIT AND IMAGE-FORMING APPARATUS HAVING A FUNCTION OF CANCELING UNEVENNESS OF SCANNING-LIGHT AMOUNT

(75) Inventors: Kouichi Takaki, Tokyo (JP); Shinji Morita, Tokyo (JP)

(73) Assignee: Konica Corporation, Tokyo (JP)

( * ) Notice: Subject to any disclaimer, the term of this patent is extended or adjusted under 35 U.S.C. 154(b) by 155 days.

(21) Appl. No.: 10/091,234

(22) Filed: Mar. 4, 2002

(65) Prior Publication Data

US 2002/0135666 A1 Sep. 26, 2002

(30) Foreign Application Priority Data

Mar. 22, 2001 (JP) ........................................ 2001-083302

(51) Int. Cl.[7] ................................................. B41J 2/47
(52) U.S. Cl. ....................................................... 347/247
(58) Field of Search ................................ 347/237, 247, 347/249, 252

(56) References Cited

U.S. PATENT DOCUMENTS 5,852,293 A * 12/1998 Iwasaki et al. ............. 250/235

6,477,656 B1 * 11/2002 Takaki et al. ............... 713/401

FOREIGN PATENT DOCUMENTS

JP          2000-198235     *  7/2000      ............. B41J/2/44

* cited by examiner

*Primary Examiner*—Huan Tran
(74) *Attorney, Agent, or Firm*—Frishauf, Holtz, Goodman & Chick, P.C.

(57) ABSTRACT

The invention concerns a clock-generating circuit, which generates dot clock pulses for driving a light-emitting element employed in an optical-writing section of an image-forming apparatus and has a function of canceling unevenness of scanning-light amount caused by variations of transmittances and reflectances in the optical-writing section when a polygon mirror scans a laser beam. The clock-generating circuit includes a digital-delay dot clock adjusting section to adjust timings of rising-edges or falling-edges of the dot clock pulses generated by changing a selection for a plurality of delayed-clock pulses, which are generated by delaying clock-pulses, outputted from a reference oscillator, in slightly different delay times; and a controlling section to control a selecting operation for the plurality of delayed clock pulses, performed in the digital-delay dot clock adjusting section, so as to compensate for unevenness of scanning-light amount caused by the variations of transmittances and reflectances in the optical-writing section.

12 Claims, 10 Drawing Sheets

CLOCK-GENERATING CIRCUIT AND IMAGE-FORMING APPARATUS HAVING A FUNCTION OF CANCELING UNEVENNESS OF SCANNING-LIGHT AMOUNT

BACKGROUND OF THE INVENTION

The present invention relates to a clock-generating circuit and image-forming apparatus employing a polygon mirror in its optical writing section, and specifically relates to a combination of an image-forming apparatus and a clock-generating circuit, which makes it possible to reduce influence to the image quality caused by variations of transmittances and reflectances in the optical-writing section when the polygon mirror scans a laser beam.

In conventional image-forming apparatus, an image is formed on an image-bearing member rotating in a sub-scanning direction by scanning a laser beam, modulated in response to image data, in a main-scanning direction. In this operation, the laser beam is modulated in response to the image data in reference to reference signals called as dot clock pulses.

Accordingly, in accordance with a predetermined number of dot clock pulses, it is necessary to generate the dot clock pulses in order that the length of the image, formed on the image-bearing member, is always kept constant in the main-scanning direction.

Further, in recent years it has been developed a color image forming apparatus equipped with a plurality of units comprising means for charging, exposure, and development respectively in the vicinity of the image-bearing member, on which a full color toner image is formed during one revolution of it, and transferring the full color toner image onto a recording paper at a time. On the other hand, it has been also developed a color image forming apparatus equipped with a plurality of image-bearing members in the vicinity of an intermediate transfer member and equipped with means for charging, exposure, development and transfer around each of the image-bearing members respectively, transferring the toner images having been formed on the respective image-bearing members sequentially onto the intermediate transfer member, and further transferring the full color toner image born on the intermediate transfer member onto the recording paper at a time.

Incidentally, FIG. 8 shows perspective view of a configuration of optical writing section 490 employing a laser beam in the image-forming apparatus as described in the above. As shown in FIG. 8, laser diode 470 (LD) emits the laser beam based on the laser driving signals generated by circuit section 400.

Further, the laser beam, emitted by laser diode 470 and having been passed through collimator lens 491 and cylindrical lens 492, is deflected for scanning by polygon mirror 493, and scans image-bearing member 1 for writing, after passing through fθ lens 494 so as to adjust the scanning velocity at constant and cylindrical lens 495. In addition, a part of the laser beam deflected by polygon mirror 493 is led to index sensor 412 for detecting the timing.

[First Problem]

As shown in FIG. 9, the laser beam, deflected for scanning by polygon mirror 493, is led to image-bearing member 1 after passing through the optical elements, including fθ lens 494, cylindrical lens 465 and dustproof filter 496.

During the abovementioned scanning operation, since the laser beam enters into each of the optical elements from a direction substantially orthogonal to them at a low incident angle when the laser beam scans in the vicinity of the scanning center, the reflectances become low values while the transmittances become high values. On the contrary, since the laser beam enters into each of the optical elements from a direction inclined to them at a high incident angle when the laser beam scans in both end portions of the scanning region, the reflectances become high values while the transmittances become low values. Incidentally, the length of the arrow in FIG. 9 illustratively indicates the intensity of the reflected light.

The variation of the light intensity to be irradiated onto image-bearing member 1, caused by the above-mentioned changes of reflectances and transmittances, results in a quality deterioration of the image formed on image-bearing member 1, which is called as an unevenness of scanning-light amount (a shading). Although the scanning-light amount is generally apt to decrease at the both end portions of the scanning region, the shading property would vary depending on the shapes and arrangements of various kinds of lenses and filters included in the optical system, as shown in FIG. 10.

Further, in a certain manner of disposing dustproof filter 496, the scanning-light amount would be possibly lowered at only one end portion of the main-scanning region. In the example shown in FIG. 9, since an amount of light reflected by the dustproof filter 496 increases at the right end portion of the main-scanning region, the unevenness of the scanning-light amount would be apt to also increase. Accordingly, as for conventional image-forming apparatus, not only the mechanically optimum disposition, but also the unevenness of the scanning-light amount has restricted the design flexibility of disposing dustproof filter 496.

Still further, to suppress the above-mentioned unevenness of the scanning-light amount as lower as possible, it has been effective to apply an expensive multi-coating treatment onto each of the optical elements concerned. It has been a problem, however, that such the treatment surely raises the total cost of the optical elements.

[Second Problem]

With respect to the first problem mentioned above, in an image-forming apparatus in which multi-valued pulses for driving the laser diode are generated in the PWM (Pulse Width Modulation) process, it would be an applicable countermeasure that the PWM values, generated at a portion where the scanning-light amount does not decrease, are lowered to a level equivalent to the light amount to be reduced by the shading effect, so as to cancel the unevenness of the image caused by the shading effect. For instance, when the scanning-light amount decreases by 15% of it at the end portion of the main-scanning region due to the shading effect, it is possible to keep the resulted scanning-light amount constant over the whole region of the image by lowering the PWM values for the portion where the scanning-light amount does not decrease.

The abovementioned countermeasure, however, restricts the dynamic-range of the scanning-light intensity at a maximum light amount side. In the above example, the dynamic-range of the scanning-light intensity is restricted within a range of 0–85%. In other words, although the abovementioned countermeasure can suppress the shading effect, there would arise another problem that such the countermeasure adversely affects the gradation characteristic of the image.

SUMMARY OF THE INVENTION

To overcome the abovementioned drawbacks in conventional image-forming apparatus, it is an object of the present invention to provide a clock-generating circuit and an image-forming apparatus employing the polygon mirror in its optical writing system, which make it possible to reduce the influence to the image quality, caused by the unevenness of the scanning-light amount (the shading effect).

Accordingly, to overcome the cited shortcomings, the abovementioned object of the present invention can be attained by clock-generating circuits and image-forming apparatus described as follow.

(1) A circuit for generating dot clock pulses for driving a light-emitting element employed in an optical-writing section of an image-forming apparatus, comprising: a digital-delay dot clock adjusting section to adjust timings of rising-edges or falling-edges of the dot clock pulses generated by changing a selection for a plurality of delayed-clock pulses, which are generated by delaying clock-pulses, outputted from a reference oscillator, in slightly different delay times; and a controlling section to control a selecting operation for the plurality of delayed clock pulses, performed in the digital-delay dot clock adjusting section, so as to compensate for unevenness of scanning-light amount caused by an optical element employed in the optical-writing section.

(2) A circuit for generating dot clock pulses for driving a light-emitting element employed in an optical-writing section of an image-forming apparatus, comprising: an index sensor to detect a light-beam, which is emitted from the light-emitting element and is deflected for scanning by a light-scanning device employed in the optical-writing section, and to output an index signal when the index sensor detects the light-beam at an end portion of a main-scanning region scanned by the light-beam; a delay-chain section to generate a plurality of delayed-clock pulses by delaying clock-pulses, outputted from a reference oscillator, in slightly different delay times; a synchronized clock pulse detecting section to select synchronized delayed-clock pulses, which are synchronized with the index signal, out of the plurality of delayed clock pulses generated in the delay-chain section, and to output a number of delay-stages, which is derived from the synchronized delayed-clock pulses, as synchronizing information; a table memory to store scanning-light unevenness information, which represents unevenness of scanning-light amounts caused by an optical element employed in the optical-writing section; a delayed-clock switching section to generate a select signal, for selecting a specific delayed-clock pulse, having a phase suitable for compensating for the unevenness of scanning-light amount caused by the optical element employed in the optical-writing section, out of the plurality of delayed-clock pulses, based on the synchronized delayed-clock pulses and the synchronizing information outputted from the synchronized clock pulse detecting section and the scanning-light unevenness information stored in the table memory; and a selector to select the specific delayed-clock pulse out of the plurality of delayed-clock pulses in response to the select signal generated by the delayed-clock switching section.

(3) The circuit of item 2, wherein the select signal is generated in the delayed-clock switching section by performing a calculating operation, based on the synchronized delayed-clock pulses outputted by the synchronized clock pulse detecting section and the scanning-light unevenness information stored in the table memory.

(4) The circuit of item 2, wherein the select signal is generated in the delayed-clock switching section by performing a table-converting operation, based on the synchronized delayed-clock pulses outputted by synchronized clock pulse detecting section and the scanning-light unevenness information stored in the table memory.

(5) The circuit of item 2, wherein the unevenness of scanning-light amount is a variation of light amount due to non-uniformity of reflectance and/or transmittance caused by the optical element.

(6) The circuit of item 2, wherein the delay-chain section, the synchronized clock pulse detecting section, the table memory and the selector are digital circuits fabricated in an integrated circuit.

(7) An image-forming apparatus, comprising: an image-forming section that includes an optical-writing section to form an image; and a circuit for generating dot clock pulses for driving a light-emitting element employed in the optical-writing section included in the image-forming section;

wherein the circuit includes, a digital-delay dot clock adjusting section to adjust timings of rising-edges or falling-edges of the dot clock pulses generated by changing a selection for a plurality of delayed-clock pulses, which are generated by delaying clock-pulses, outputted from a reference oscillator, in slightly different delay times, and a controlling section to control a selecting operation for the plurality of delayed clock pulses, performed in the digital-delay dot clock adjusting section, so as to compensate for unevenness of scanning-light amount caused by an optical element employed in the optical-writing section;

and wherein the image-forming section performs an image-forming operation based on clock signals outputted from the digital-delay dot clock adjusting section.

(8) An image-forming apparatus, comprising: an image-forming section that includes an optical-writing section to form an image; and a circuit for generating dot clock pulses for driving a light-emitting element employed in the optical-writing section included in the image-forming section;

wherein the circuit includes: an index sensor to detect a light-beam, which is emitted from the light-emitting element and is deflected for scanning by a light-scanning device employed in the optical-writing section, and to output an index signal when the index sensor detects the light-beam at an end portion of a main-scanning region scanned by the light-beam; a delay-chain section to generate a plurality of delayed-clock pulses by delaying clock-pulses, outputted from a reference oscillator, in slightly different delay times; a synchronized clock pulse detecting section to select synchronized delayed-clock pulses, which are synchronized with the index signal, out of the plurality of delayed clock pulses generated in the delay-chain section, and to output a number of delay-stages, which is derived from the synchronized delayed-clock pulses, as synchronizing information; a table memory to store scanning-light unevenness information, which represents unevenness of scanning-light amounts caused by an optical element employed in the optical-writing section; a delayed-clock switching section to generate a select signal, for selecting a specific delayed-clock pulse, having a phase suitable for compensating for the unevenness of scanning-light amount caused by the optical element employed in the optical-writing section, out of the plurality of delayed-clock pulses, based on the synchronized delayed-clock pulses and the synchronizing information outputted from the synchronized clock pulse detecting section and the scanning-light unevenness information stored in the table memory; and a selector to select the specific delayed-clock pulse out of the plurality of delayed-clock pulses in response to the select signal generated by the delayed-clock switching section; and wherein the image-forming section performs an image-forming operation based on clock signals outputted from the selector.

(9) The image-forming apparatus of item 8, wherein the select signal is generated in the delayed-clock switching section by performing a calculating operation, based on the synchronized delayed-clock pulses outputted by the synchronized clock pulse detecting section and the scanning-light unevenness information stored in the table memory.

(10) The image-forming apparatus of item 8, wherein the select signal is generated in the delayed-clock switching section by performing a table-converting operation, based on the synchronized delayed-clock pulses outputted by synchronized clock pulse detecting section and the scanning-light unevenness information stored in the table memory.

(11) The image-forming apparatus of item 8, wherein the unevenness of scanning-light amount is a variation of light amount due to non-uniformity of reflectance and/or transmittance caused by the optical element.

(12) The image-forming apparatus of item 8, wherein the delay-chain section, the synchronized clock pulse detecting section, the table memory and the selector are digital circuits fabricated in an integrated circuit.

Further, to overcome the abovementioned problems, other clock-generating circuits and image-forming apparatus, embodied in the present invention, will be described as follow:

(13) A clock-generating circuit for generating dot clock pulses for driving a light-emitting element employed in a writing section of an image-forming apparatus, characterized by comprising:

digital-delay dot clock adjusting means for changing timings of rising-edges or falling-edges of dot clock pulses generated by changing a selection for a plurality of delayed-clock pulses, which are generated by delaying clock-pulses, outputted from a reference oscillator, in slightly different delay times; and controlling means for controlling a selection of the plurality of delayed clock pulses, performed in the digital-delay dot clock adjusting means, so as to compensate for unevenness of scanning-light amount caused by an optical element employed in the writing section.

(14) An image-forming apparatus characterized by comprising:

digital-delay dot clock adjusting means for changing timings of rising-edges or falling-edges of dot clock pulses generated by changing a selection for a plurality of delayed-clock pulses, which are generated by delaying clock-pulses, outputted from a reference oscillator, in slightly different delay times;

controlling means for controlling a selection of the plurality of delayed clock pulses, performed in the digital-delay dot clock adjusting means, so as to compensate for unevenness of scanning-light amount caused by an optical element employed in a writing section; and image-forming means for performing image-forming operations based on clock signals from the digital-delay dot clock adjusting means; and characterized in that pulse-widths of dot clock pulses are changed by controlling selections of a plurality of delayed clock signals so as to compensate for the unevenness of scanning-light amount.

According to the above invention, since a plurality of delayed-clock pulses are generated by delaying clock-pulses, outputted from a reference oscillator, in slightly different delay times, and a selection of the plurality of delayed clock pulses is changed in response to the unevenness of scanning-light amount, it is possible to cancel the unevenness of scanning-light amount on the surface of the image-bearing member by slightly changing timings of rising-edges or falling-edges of dot clock pulses.

As a result, in the image-forming apparatus incorporating a polygon mirror in the optical writing system, and its clock generating circuit, it becomes possible to reduce the influence to the image quality, caused by the unevenness of scanning-light amount, with a simple circuit configuration.

(15) A clock-generating circuit generating dot clock pulses for driving a light-emitting element employed in a writing section of an image-forming apparatus, characterized by comprising:

a delay-chain section to generate a plurality of delayed-clock pulses by delaying clock-pulses, outputted from a reference oscillator, in slightly different delay times, a synchronized clock pulse detecting section to select a plurality of delayed-clock pulses (synchronized delayed-clock pulses), which are synchronized with an index signal being a reference of an end portion, from the delay-chain section, and to output a number of delay-stages of the delay-chain section from the synchronized delayed-clock pulses, as synchronizing information;

a table to hold scanning-light unevenness information, pertaining to unevenness of scanning-light caused by an optical element used in the writing section;

a synchronized switching section to generate a select signal, for determining what phased delayed-clock pulse should be selected out of the plurality of delayed-clock pulses from the synchronized delayed-clock pulses and the synchronizing information outputted from the synchronized clock pulse detecting section and the scanning-light unevenness information from the table; and a signal selecting section to select the delayed-clock pulse corresponding to the select signal out of the plurality of delayed-clock pulses; and characterized in that pulse-widths of dot clock pulses are changed by controlling selections of a plurality of delayed clock signals so as to compensate for the unevenness of scanning-light amount.

(16) An image-forming apparatus characterized by comprising:

a delay-chain section to generate a plurality of delayed-clock pulses by delaying clock-pulses, outputted from a reference oscillator, in slightly different delay times, a synchronized clock pulse detecting section to select a plurality of delayed-clock pulses (synchronized delayed-clock pulses), which are synchronized with an index signal being a reference of an end portion, from the delay-chain section, and to output a number of delay-stages of the delay-chain section from the synchronized delayed-clock pulses, as synchronizing information;

a table to hold scanning-light unevenness information, pertaining to unevenness of scanning-light caused by an optical element used in the writing section;

a synchronized switching section to generate a select signal, for determining what phased delayed-clock pulse should be selected out of the plurality of delayed-clock pulses from the synchronized delayed-clock pulses and the synchronizing information outputted from the synchronized clock pulse detecting section and the scanning-light unevenness information from the table;

a signal selecting section to select the delayed-clock pulse corresponding to the select signal out of the plurality of delayed-clock pulses; and image-forming means for performing an image-forming operation based on the clock signals outputted from the signal selecting section; and characterized in that pulse-widths of dot clock pulses are changed by controlling selections of a plurality of delayed clock signals so as to compensate for the unevenness of scanning-light amount.

According to the above invention, since the delay-chain section generates the plurality of delayed-clock pulses by delaying clock-pulses, outputted from a reference oscillator, in slightly different delay times, and the selection of the plurality of delayed-clock pulses in the signal selecting section is changed by the select signal from the synchronized clock pulse detecting section based on the synchronizing information from the synchronized clock pulse detecting section and the scanning-light unevenness information held in the table, it is possible to cancel the unevenness of scanning-light amount on the surface of the image-bearing member by slightly changing timings of rising-edges or falling-edges of dot clock pulses and thereby changing the pulse-widths of pulses for driving the light-emitting element.

As a result, in the image-forming apparatus incorporating a polygon mirror in the optical writing system, and its clock generating circuit, it becomes possible to reduce the influence to the image quality, caused by the unevenness of scanning-light amount, with a simple circuit configuration.

(17) The clock-generating circuit described in item 15, characterized in that synchronized switching section generates the select signal by performing a calculating operation, from the synchronized delayed-clock pulses from the synchronized clock pulse detecting section and the scanning-light unevenness information from the table.

(18) The image-forming apparatus described in item 16, characterized in that synchronized switching section generates the select signal by performing a calculating operation, from the synchronized delayed-clock pulses from the synchronized clock pulse detecting section and the scanning-light unevenness information from the table.

According to the above invention, since a plurality of delayed-clock pulses are generated by delaying clock-pulses, outputted from a reference oscillator, in slightly different delay times, and the selection of the plurality of delayed-clock pulses is changed in response to the result of calculations performed by referring to the unevenness of scanning-light amount, it is possible to cancel the unevenness of scanning-light amount on the surface of the image-bearing member by slightly changing timings of rising-edges or falling-edges of dot clock pulses and thereby changing the pulse-widths of pulses for driving the light-emitting element.

As a result, in the image-forming apparatus incorporating a polygon mirror in the optical writing system, and its clock generating circuit, it becomes possible to reduce the influence to the image quality, caused by the unevenness of scanning-light amount, with a simple circuit configuration.

(19) The clock-generating circuit described in item 15, characterized in that synchronized switching section generates the select signal by performing a table-converting operation, from the synchronized delayed-clock pulses from the synchronized clock pulse detecting section and the scanning-light unevenness information from the table.

(20) The image-forming apparatus described in item 16, characterized in that synchronized switching section generates the select signal by performing a table-converting operation, from the synchronized delayed-clock pulses from the synchronized clock pulse detecting section and the scanning-light unevenness information from the table.

According to the above invention, since a plurality of delayed-clock pulses are generated by delaying clock-pulses, outputted from a reference oscillator, in slightly different delay times, and the selection of the plurality of delayed-clock pulses is changed in response to the result of a table-converting operation performed by using a look-up table while referring to the unevenness of scanning-light amount, it is possible to cancel the unevenness of scanning-light amount on the surface of the image-bearing member by slightly changing timings of rising-edges or falling-edges of dot clock pulses and thereby changing the pulse-widths of pulses for driving the light-emitting element.

As a result, in the image-forming apparatus incorporating a polygon mirror in the optical writing system, and its clock generating circuit, it becomes possible to reduce the influence to the image quality, caused by the unevenness of scanning-light amount, with a simple circuit configuration.

(21) The clock-generating circuit described in any one of items 13, 15, 17 and 19, characterized in that the unevenness of scanning-light amount is a variation of light amount based on a difference of reflectance or transmittance of the optical element.

(22) The image-forming apparatus described in any one of items 14, 16, 18 and 20, characterized in that the unevenness of scanning-light amount is a variation of light amount based on difference of reflectance or transmittance of the optical element.

According to the above invention, in the image-forming apparatus incorporating the polygon mirror in the optical writing system, and its clock generating circuit, it becomes possible to reduce the influence to the image quality, caused by the unevenness of scanning-light amount (a variation of light amount due to non-uniformity of reflectance and/or transmittance caused by the optical element), with a simple circuit configuration.

(23) The clock-generating circuit described in any one of items 13, 15, 17, 19, and 21, characterized in that each of the sections is structured as a digital circuit in an integrated circuit.

(24) The image-forming apparatus described in any one of items 14, 16, 18, 20, and 22, characterized in that each of the sections is structured as a digital circuit in an integrated circuit.

According to the above invention, in the image-forming apparatus incorporating a polygon mirror in the optical writing system, and its clock generating circuit, it becomes possible to reduce the influence to the image quality, caused by the unevenness of scanning-light amount, with a simple configuration of digital circuits excluding any analogue circuit.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

Figure 1:
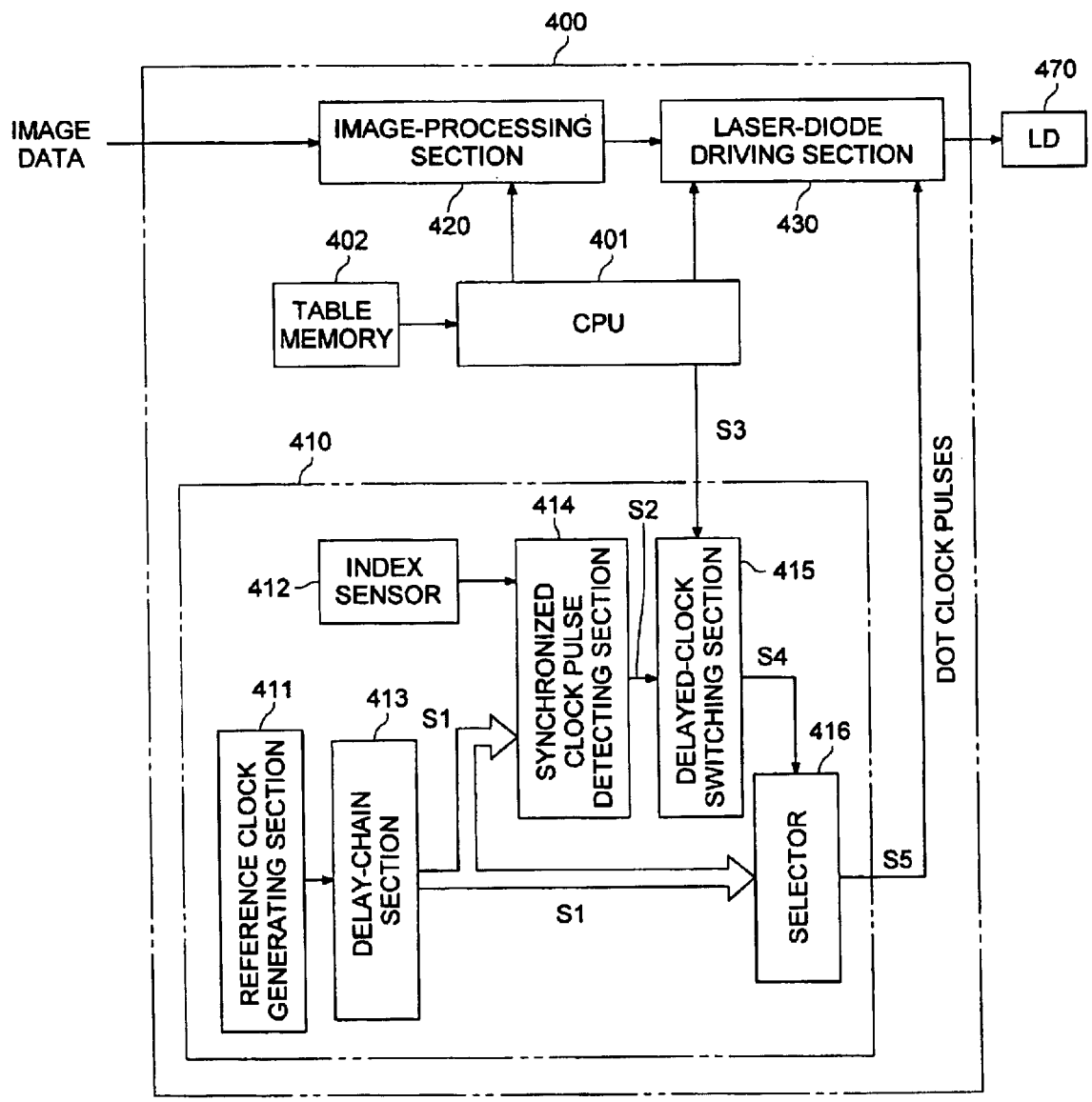
FIG. 1 shows a block diagram of a configuration of main electronic sections of an image-forming apparatus embodied in the present invention.

Referring to the drawings, an image-forming apparatus embodied in the present invention will be detailed in the following. Initially, with respect to the image-forming apparatus employing the clock-generating circuit, the whole configuration of the image-forming apparatus will be detailed in the following.

(Whole Mechanical Configuration of the Image-Forming Apparatus)

Figure 2:
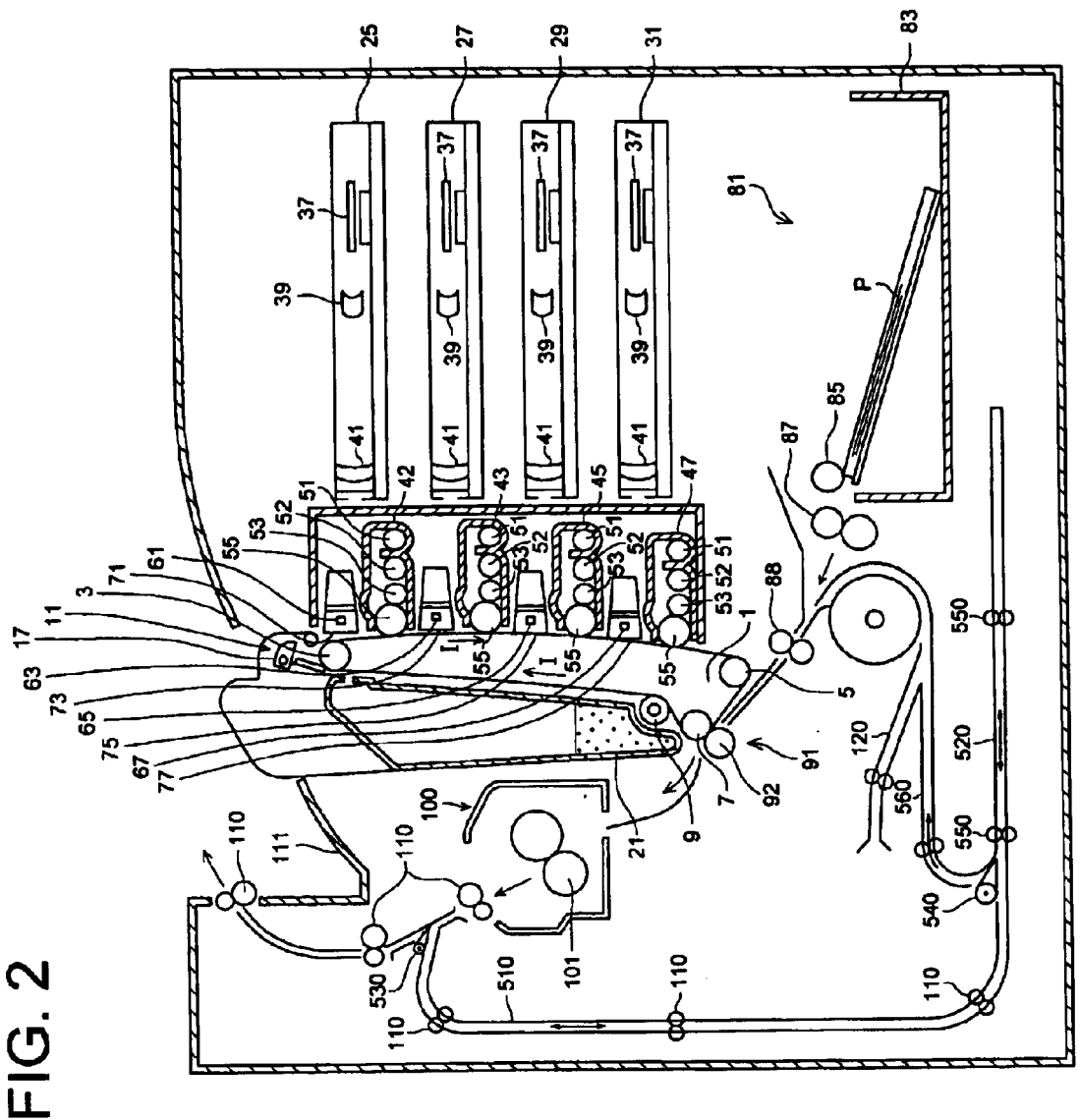
FIG. 2 shows a mechanical configuration of a color image-forming apparatus, for which the clock-generating circuit and the image-forming apparatus embodied in the present invention can be applied.

FIG. 2 shows a mechanical configuration of a color image-forming apparatus, for which the clock-generating circuit and the image-forming apparatus, embodied in the present invention, can be applied. Referring to FIG. 2, the whole configuration of the color image-forming apparatus will be detailed in the following.

Incidentally, the above embodiment is a multi-color image forming apparatus, and it is taken for instance herein the color image forming apparatus using toners of four colors, namely, Y (yellow), M (magenta), C (cyan), and K (black), and employing an image-bearing member shaped in a belt, instead of one shaped in a drum.

Image-bearing member 1 (photoreceptor 1), which is shaped in an endless belt and entrained around the upper roller 3, the lower roller 5, and the side roller 7, is extended in the upward and downward direction by the upper roller 3 and the lower roller 5, and is driven in the direction of the arrow marks I. Further, pressing roller 9, serving as guiding means for guiding image-bearing member 1 to the direction of a closed space formed by image-bearing member 1 by pressing it toward the closed space, is mounted on the surface portion of image-bearing member 1 moving from down to up.

Further, cleaning means 11, which contacts and rubs image-bearing member 1 to remove developing agents attached on the surface of image-bearing member 1, is disposed at the upper surface portion of image-bearing member 1, which moves from down to up. Further, recovery box 21, serving as collecting means for collecting the developing agents removed by cleaning means 11, is disposed below cleaning means 11 along image-bearing member 1.

Still further, latent image forming means for forming a latent image on image-bearing member 1 will be detailed in the following. Since the image-forming apparatus, embodied in the present invention, is a four-color image forming apparatus, it comprises four latent image forming means, each of which corresponds to each of the four colors. Concretely speaking, there are provided optical writing section 25 for color Y, which emits a laser beam onto the image-bearing member 1 to form a latent image of color Y (yellow), optical writing section 27 for color M, which emits a laser beam onto image-bearing member 1 to form a latent image of color M (magenta), optical writing section 29 for color C, which emits a laser beam onto image-bearing member 1 to form a latent image of color C (cyan) and optical writing section 31 for color K, which emits a laser beam onto image-bearing member 1 to form a latent image of color K (black).

Still further, developing units will be detailed in the following. Four developing units for developing the latent images for the respective colors, which have been formed on the image-bearing member 1, are provided. Concretely speaking, there are provided developing unit 42 for color Y, which develops the latent image formed by optical writing section 25 for color Y, developing unit 43 for color M, which develops the latent image formed by optical writing section 27 for color M, developing unit 45 for color C, which develops the latent image formed by optical writing section 29 for color C and developing unit 47 for color K for developing the latent image formed by optical writing section 31 for color K.

Still further, charging electrodes of charging means for giving electronic charges onto image-bearing member 1 are disposed opposite image-bearing member 1, corresponding to each of developing units 42, 43, 45, and 47 for the four colors. Concretely speaking, there are provided charging electrode 61 for color Y, charging electrode 63 for color M, charging electrode 65 for color C and charging electrode 67 for color K. In addition, each of grids 71, 73, 75, and 77 is disposed at each of the charging means corresponding to each of the four colors, to control the potential of the electronic charge charged on image-bearing member 1.

Numeral 81 indicates a paper feeding section, in which cassette 83 for storing transfer paper P, serving as a transfer material, is equipped. Conveying-out roller 85 takes out transfer paper P one by one from cassette 83, and transport roller pair 87 and registration roller pair 88 further convey transfer paper P while sandwiching it between paired rollers, so as to feed transfer paper P to transfer means 91. Transfer roller 92, electronic potential of which is kept at a polarity opposite to that of image-bearing member 1, is disposed at transfer means 91, so as to cooperate with side roller 7 in sandwiching image-bearing member 1 between them.

Numeral 100 indicates a fixing section in which a pair of heat rollers 101 applies heat and pressure onto the transfer paper P while holding it between heat rollers 101 to fix a toner image onto transfer paper P, and numeral 110 indicates a pair of transport rollers, which conveys the transfer paper P, having the fixed toner-image, to receiving tray 111 while holding it between transport rollers 110. Further, numeral 120 indicates a paper transport path, through which transfer paper P having a separate size is fed from another paper feeding section provided outside the apparatus.

Next, the overall operation of the image forming apparatus having the abovementioned configuration will be detailed in the following. When image-bearing member 1 is driven in the direction of the arrow marks I, the charging means for color Y, including charging electrode 61 and grid 71, charges the surface of image-bearing member 1 up to a predetermined charged potential. Then, optical writing means 25 for color Y forms a latent image on image-bearing member 1. Further, Coulomb's force attracts toner borne on the developing agents to image-bearing member 1 so as to form a toner image on image-bearing member 1. The same operation as the above is performed for the rest of colors, namely, M, C, and K, and toner images of Y, M, C, and K are formed on image-bearing member 1.

On the other hand, conveying-out roller 85 takes out transfer paper P from paper feeding section 81 and transport roller pair 87 conveys it to transfer means 91. Then, registration roller 88 adjusts the timing of feeding transfer paper P to transfer means 91, so as to synchronize transfer paper P with the toner image borne on image-bearing member 1. At transfer means 91, transfer roller 92 of transfer means 91 charges transfer paper P to transfer the toner image borne on image-bearing member 1 onto transfer paper P. Further, in fixing section 100, the toner image transferred onto transfer paper P is fused and fixed onto transfer paper P by applying heat and pressure to it, and then, a pair of transport rollers 110 further conveys transfer paper P having the fixed toner image to eject it onto receiving tray 111. On the other hand, after the transferring operation is completed, the residual toner particles remained on image-bearing member 1 are removed by blade 17 of cleaning means 11, and are stored in collection box 21. Incidentally, the image-forming mode mentioned above is a one side image-forming mode in which the image is formed on only an obverse side of the transfer paper P and first gate flip 530, detailed later, is always switched so as to open the paper-feeding path towards the receiving tray 111.

Next, the duplex image-forming mode will be detailed in the following.

Numeral 510 indicates a first return path of the transfer paper P, numeral 530 indicates a first gate flip to switch the paper-feeding path, numeral 540 indicates a second gate flip to switch the paper-feeding path, numeral 520 indicates a second return path of the transfer paper P, numeral 550 indicates a paper-driving roller pair to move the transfer paper P in both forward and reverse directions, numeral 520 indicates a second return path of the transfer paper P, and numeral 560 indicates a third return path of the transfer paper P.

In the duplex image-forming mode, since the first gate flip 530 is switched so as to open the paper-feeding path towards the first return path 510 and the second gate flip 540 is switched so as to open the paper-feeding path towards the second return path 520 when the color image is formed and fixed on the obverse side of the transfer paper P, the transfer paper P, having the color image on its obverse side, is fed into the first return path 510 by the pair of transport roller 110 and further fed into the second return path 520 by forward-driving action of the paper-driving roller pair 550. When a sensor (not shown in the drawings), disposed near the paper-driving roller pair 550, detects the trailing edge of the transfer paper P, the paper-driving roller pair 550 stops its forward-driving action and the second gate flip 540 is switched so as to open the paper-feeding path towards the third return path 560. Then, the paper-driving roller pair 550 starts its reverse-driving action so as to feed the transfer paper P to the registration roller 88. Successively, in the same process as that for forming the color image of the obverse side, another color image is formed and fixed on the reverse side of the transfer paper P, and finally, the transfer paper P having the duplex image is ejected onto the receiving tray 111 by the pair of transport roller 110.

DETAILED CONFIGURATION OF THE IMAGE-FORMING APPARATUS

The image-forming apparatus embodied in the present invention will be detailed in the following.

FIG. 1 shows a block diagram of the configuration of the clock-generating circuit, which is incorporated in each of optical writing sections 25, 27, 29, 31 respectively corresponding to colors Y, M, C, K, with CPU 401 and other blocks.

Incidentally, although only a single clock-generating circuit (circuit section 400) is indicated in FIG. 1, four clock-generating circuits, each of which has the same configuration as that indicated in FIG. 1 and corresponds to each of four colors Y, M, C, K, are provided in the color image-forming apparatus. While, in a monochrome image-forming apparatus, only a single clock-generating circuit is provided.

As shown in FIG. 1, circuit section 400 includes CPU 401, serving as controlling means for conducting various kinds of controlling actions, table memory 402 to store data of unevenness of the scanning-light amount (shading data), dot-clock adjusting section 410 being a section featured by the present invention, image-processing section 420 for performing image-processing operations and laser-diode driving section 430 to generate laser-diode driving signals corresponding to dot-clock signals on the basis of the result of image-processing operations.

The clock-generating circuit, embodied in the present invention, can be roughly divided into three sections, such as CPU 401 serving as a controlling means, table memory 402 and dot-clock adjusting section 410. The configuration and operations of dot-clock adjusting section 410 will be detailed in the following.

Incidentally, dot-clock adjusting section 410 also serves as a digital delay dot-clock adjusting section indicated in the claims, which performs the following operations described in items (A), (B), (C) and (D).

(A) Generation of Delayed Clock Signals

Delay-chain section 413 is a group of delay elements for delaying the inputted signal (the reference clock signal outputted from reference clock generating section 411) to obtain a plurality of delayed clock signals (a delayed-signal group: S1 in FIG. 1), phases of which are slightly different relative to each other.

Incidentally, in delay-chain section 413, it is desirable that the delay elements are cascaded as a chain in such a number of stages that the delayed clock signals, phases of which are slightly different relative to each other, can be formed over two period of the reference clock.

Further, it is applicable that the reference clock generating section 411 is incorporated in each clock generating circuit for each color, or it is also applicable that reference clock signals are distributed to each of the clock generating circuits from reference clock generating section 411, serving as a single clock generating section.

Figure 8:
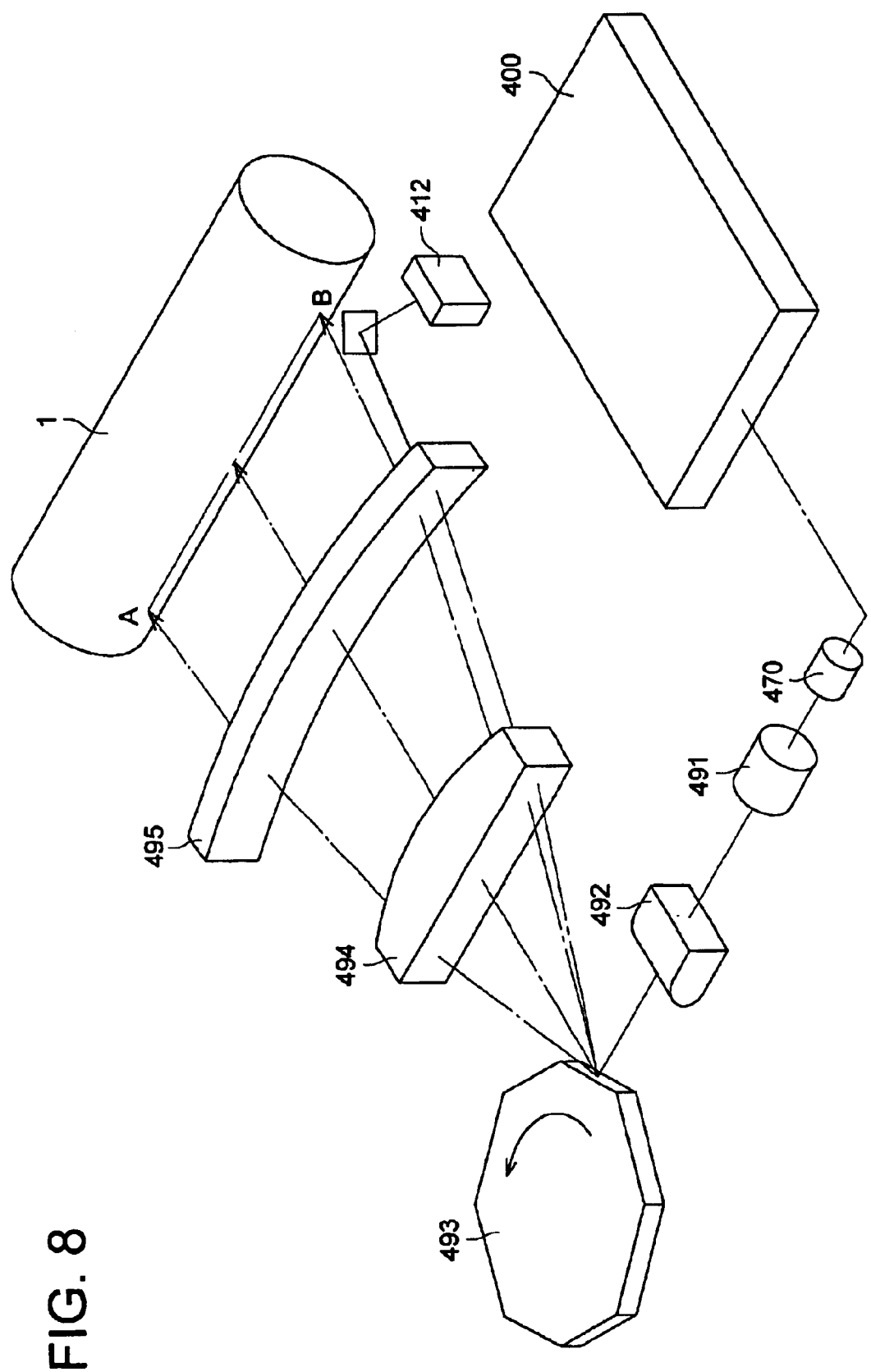
FIG. 8 shows perspective view of a mechanical configuration of an optical writing section in an image-forming apparatus.
Figure 9:
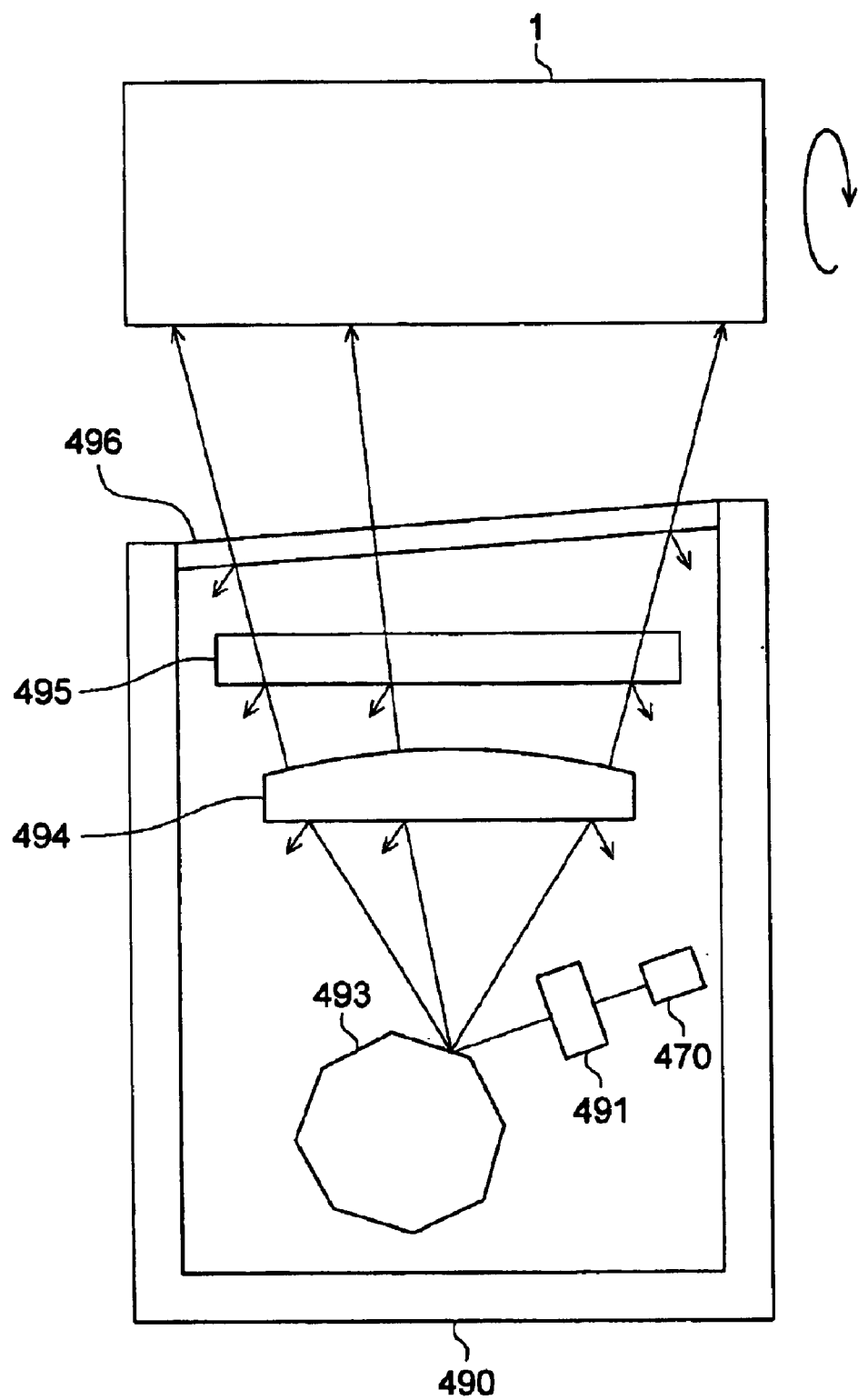
FIG. 9 shows a plane view of an optical writing section and an image bearing member, illustrating optical paths, which causes unevenness of scanning-light amount.
Figure 10:
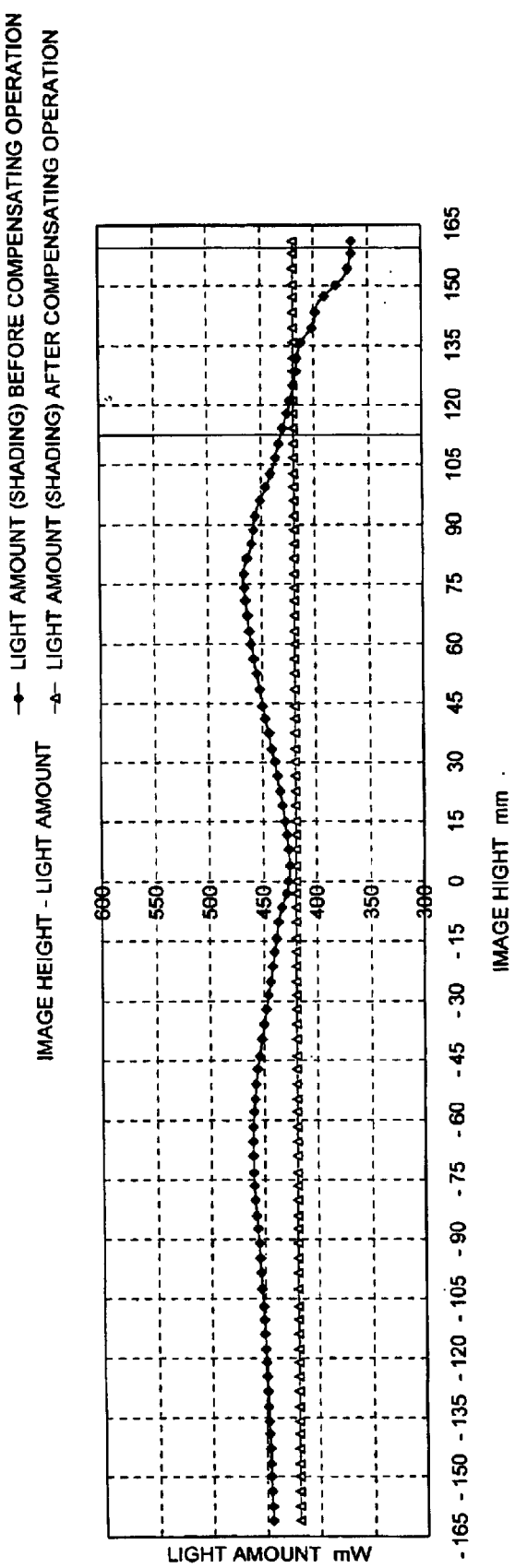
FIG. 10 shows a graph of unevenness of scanning-light amount (the shading effect) due to non-uniformity of reflectance and/or transmittance caused by the optical element.

Still further, as shown in FIG. 8, index sensor 412 is utilized for detecting a reference position for the laser-beam scanning operation.

(B) Detection of Synchronized Clock Pulse

Synchronized clock pulse detecting section 414 receives a signal detected by the index sensor 412 and detects the stage number (the synchronizing point) of the delayed clock pulse, which is synchronized with the index signal out of the delayed-signal group (S1 in FIG. 1), to output the synchronizing point information (S2 in FIG. 1).

Incidentally, it is desirable that the synchronized clock pulse detecting section 414 can output the first synchronizing point information SP1 at which synchronization with the index signal initially occurs and the second synchronizing point information SP2 at which synchronization with the index signal secondly occurs, among the delayed-signal group (S1 in FIG. 1).

Since there is a possibility that a plurality of delayed-signals outputted from delay-chain section 413 would be fluctuated in their delay times due to an influence of temperature change, etc., it is necessary to detect a number of delayed-signals included within a predetermined time interval of no fluctuation (namely, the time interval between an index signal and a next index signal) in advance, in the manner mentioned above.

(C) Calculation of Synchronized Compensation Amount

Delayed-clock switching section 415 finds a synchronized compensation amount on the basis of the synchronizing point information (S2 in FIG. 1) outputted by synchronized clock pulse detecting section 414 and the frequency-deviation information outputted by CPU 401, and outputs a selecting signal (S4 in FIG. 1) to select a delayed clock having a suitable phase out of the delayed-signal group (S1 in FIG. 1). Incidentally, the frequency-deviation information will be detailed later on.

(D) Selection of Delayed Clock & Output of Dot Clock Pulses

Then, selector 416 receives the selecting signal sent from delayed-clock switching section 415 (S4 in FIG. 1) to select a delayed clock having a corresponding phase, and outputs the selected delayed clock serving as the dot clock pulses (S5 in FIG. 1).

Accordingly, in the abovementioned embodiment, the dot clock pulses having a predetermined number of pulses within a predetermined time interval are generated by slightly increasing or decreasing periods of the dot clock pulses. In other words, instead of applying a fine adjustment to the clock frequency, a number of dot clock pulses within a predetermined time interval is adjusted at a predetermined number in such a manner that delayed clock signals, phases of which (namely, positions of the dot clock pulses, or timings of them) are slightly and gradually changed relative to each other, are successively selected within a predetermined time interval without changing the clock frequency itself.

(Deviation Detecting Principle for Adjusting the Dot Clock Pulses)

Figure 3:
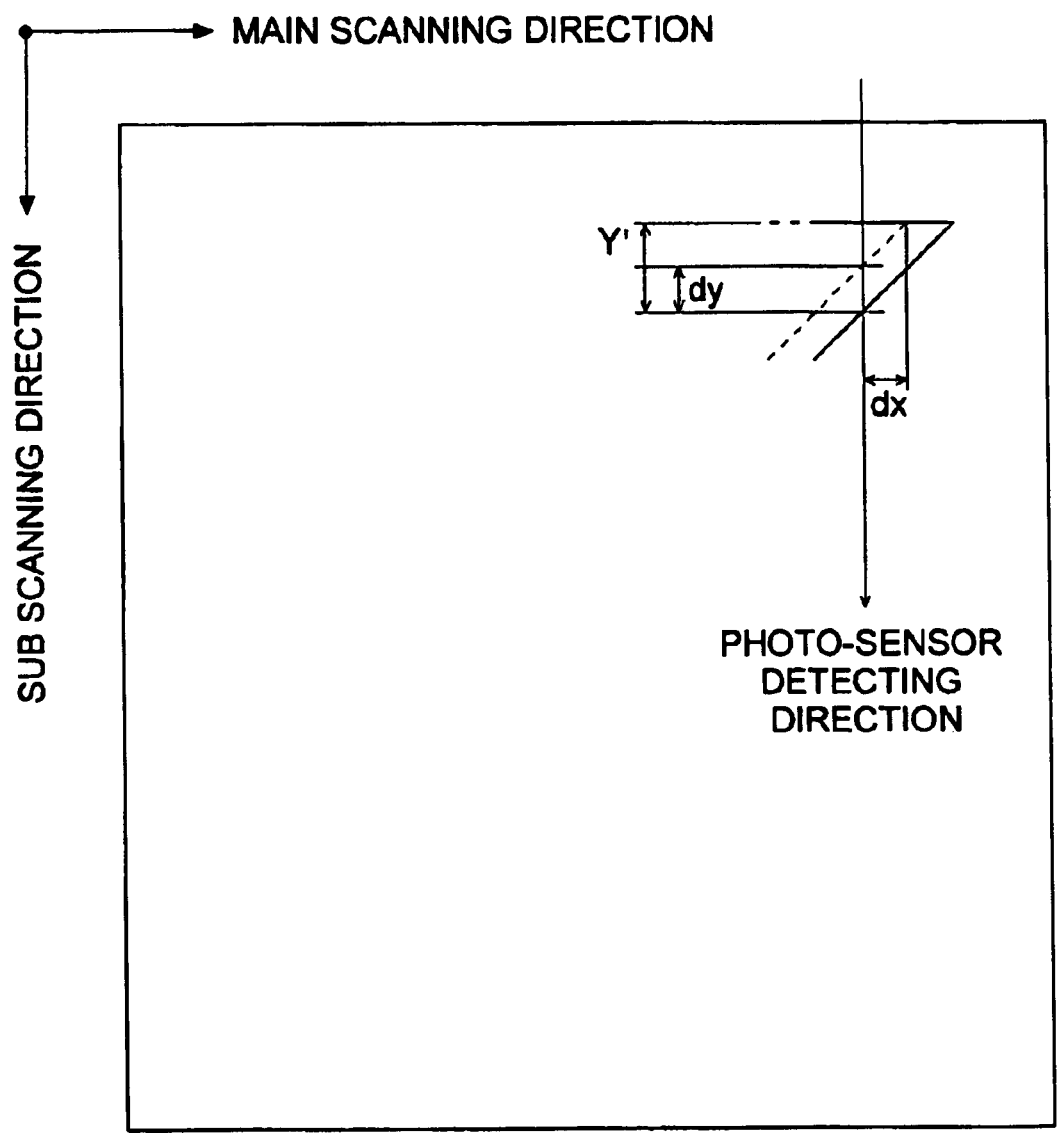
FIG. 3 shows a chart for explaining a deviation detecting operation performed in an image-forming apparatus embodied in the present invention.

Now, with reference to FIG. 3, how deviation is detected will be simply explained. An image of a predetermined pattern (here, a pattern made up of a folded line composed of a horizontal line and an oblique line making an acute angle with the former) is formed at the leading end side on image-bearing member 1 by optical writing sections 25, 27, 29, 31 respectively corresponding to colors Y, M, C, K. A pattern indicated by the solid lines has been actually formed on the image-bearing member, but if it is properly formed, a pattern indicated by the broken line is expected.

Here, a deviation of dx is produced in a main scanning direction due to mechanical deviations in the optical writing sections, aberrations of the optical elements in the optical systems, etc. In this case, color-mottle sensor 210, disposed at a position at which a reading operation of the pattern is possible while moving the image-bearing member in the sub-scanning direction, reads the pattern to detect a deviation of dy included in the distance Y' from the horizontal line to the oblique line of the predetermined pattern.

Now, let θ be the angle made by the horizontal line and the oblique line, then the deviation dx in the direction of main scanning can be obtained by the following equation:

$$dx = dy/\tan\theta$$

Further, it is also possible to derive dy from the moving velocity of the image-bearing member and the difference between reading times of the horizontal line and the oblique line included in the predetermined pattern.

Accordingly, the abovementioned operations for forming and reading the predetermined pattern for the respective colors Y, M, C, K at both of the leading end and the trailing end in the main scanning direction, which reside on the same sub-scanning position, make it possible for CPU 401 to detect the state of deviation (frequency deviation information) concerning the expansion and contraction of the image in the main scanning direction.

Incidentally, although only one predetermined pattern is indicated in FIG. 3, two predetermined patterns should be formed in the real application.

Further, operations for forming the predetermined patterns of the same shape as the above at both of the leading end and the trailing end in the main scanning direction, which reside on the same sub-scanning position, and measuring the distance between them, make it possible for CPU 401 to detect the state of deviation (frequency deviation information) concerning the expansion and contraction of the image in the main scanning direction as well.

As mentioned above, CPU 401 performs such the detecting processing and sends the frequency deviation information (S3 in FIG. 1, S3 in FIG. 2) to the optical writing sections.

Incidentally, as well as the above, it is also possible that CPU 401 detects the predetermined pattern at the leading end in the main scanning direction to find the image leading end deviation information in respect to the starting position of the image in the main scanning direction, and sends the detected image leading end deviation information to the optical writing sections.

(Operations of Image-Forming Apparatus)

Next, operations of the image-forming apparatus, embodied in the present invention, will be detailed in the following. The following explanation will be divided into two stages, namely, operation (1) and operation (2).

(Dot Clock Adjusting Operation in Digital Delay Method (1))

Figure 4:
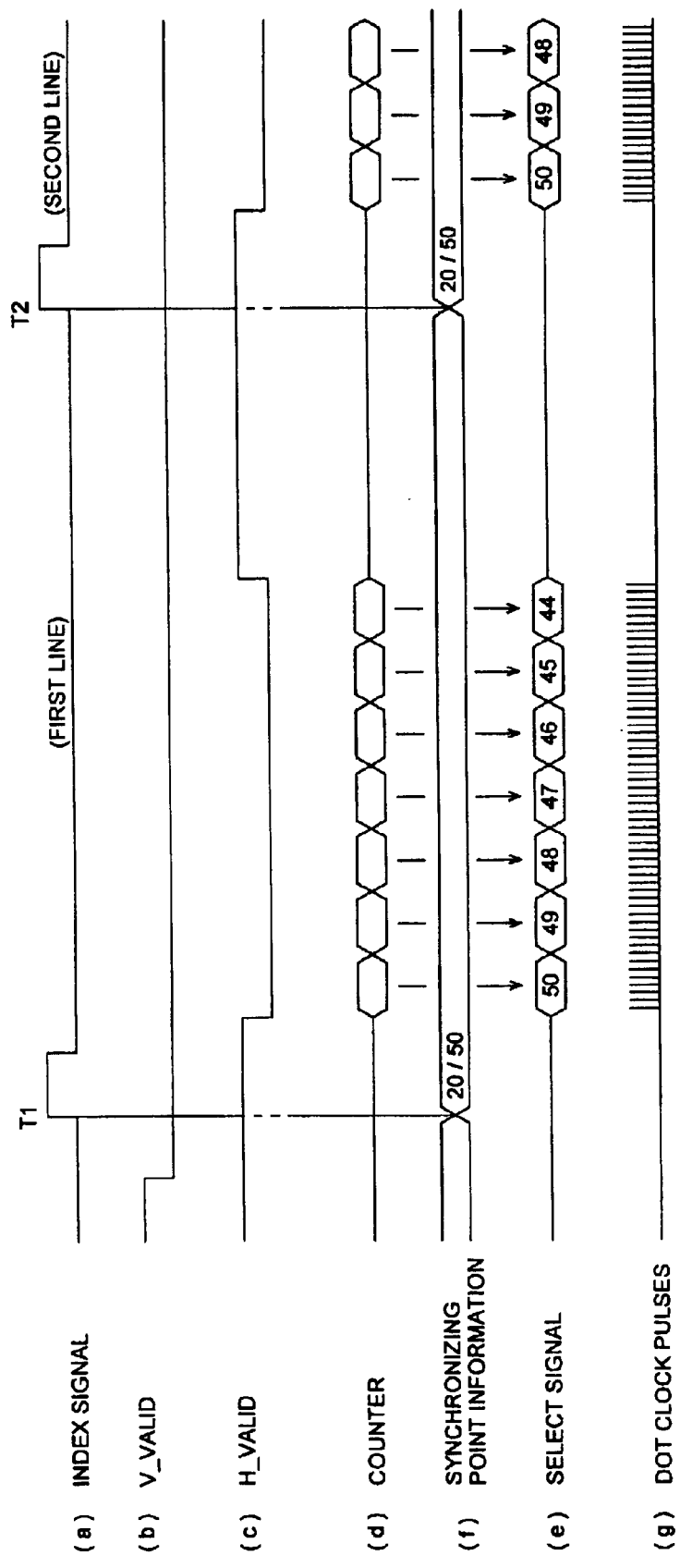
FIG. 4 shows a timing-chart for explaining an operating status of an image-forming apparatus embodied in the present invention.

Referring to the time chart shown in FIG. 4, in regard to an arbitrary color taken for instance, operations for shifting reference clock pulses every certain time interval while referring deviation information to adjust a number of pulses at a predetermined number, and adjusting the time for generating the predetermined number of pulses at a predetermined time will be initially explained up to a point where the dot clock pulse is generated.

CPU 401 sends frequency deviation information, indicating the frequency deviation ER detected by the aforementioned operations of forming and reading the predetermined pattern, clock period information of clock period TC, derived from the frequency of the reference clock pulses, and number-of-pixels per line information, indicating a number of pixels to be formed in the main scanning direction, to the correction value calculating means in delayed-clock switching section 415. Further, number of synchronized stages NS (namely, a number of stages for obtaining a delay time equivalent to one period of the reference clock) can be derived from first synchronizing point information SP1 and second synchronizing point information SP2, which are outputted from synchronized clock pulse detecting section 414.

Now, the correction value calculating means in delayed-clock switching section 415 finds correction count value CC (count load data) corresponding to the correction value on the basis of the equation shown in the following:

$$CC = PH \times (NS/TC)/ER \qquad (1)$$

This correction count value CC is utilized for the purpose that the switching count means in delayed-clock switching section 415 counts down the number of pulses to switch the select signal and the lower rank select signal. Accordingly, correction count value CC becomes smaller as the correction value becomes larger.

Further, referring to the rising-edge of the index signal outputted by index sensor 412, synchronized clock pulse detecting section 414 finds a number of stages in delay-chain section 413, by which a delayed clock pulse synchronized with the rising-edge of the index signal can be obtained, as the synchronizing point information.

Now, it is assumed that the first synchronizing point information SP1 is obtained as 20, and the second synchronizing point information SP2 is obtained as 50. Thus, in this case, number of synchronized stages NS mentioned above is 30.

Further, when the scanning operation of the laser beam is performed in the optical writing section, the index sensor generates the index signal at the timing when it detects the laser beam (T1 of line (a) in FIG. 4). Then, H_VALID indicating the effective area in the horizontal direction is activated.

Further, the switching count means in delayed-clock switching section 415 continues to repeatedly count down the aforesaid correction count value CC in accordance with the reference clock pulses. Still further, every time when the count value becomes zero as a result of the counting-down operation, it sends count data as interrupting signals to select-signal calculating section 443 in delayed-clock switching section 415 (line (d) to (f) in FIG. 4).

Further, CPU 401 sends deviation direction information to select-signal calculating section 443 in delayed-clock switching section 415; it sends {−correction} information for making a correction to give contraction against the deviation expanding in the main scanning direction, and it sends {+correction} information for making a correction to give expansion against the contraction in the main scanning direction. In the following, the case of {−correction} is taken for instance.

It is assumed that frequency deviation information ER and the deviation direction information have been obtained by the above-described formation of the predetermined pattern and its measurement. It is also assumed that ER is 6 ns and the deviation direction information is {−correction}, namely, it indicates that correction to give contraction against the expanded image should be made.

Initially, referring to the rising-edge of the index signal outputted by the index sensor (not shown in the drawings), synchronized clock pulse detecting section 414 finds first synchronizing point information SP1 and second synchronizing point information SP2.

First synchronizing point information SP1 indicates a stage number of the delay element in delay-chain section 413, which is synchronized with the rising-edge of the index signal, while second synchronizing point information SP2 indicates a stage number of the delay element in delay-chain section 413, which is delayed by one period of the reference clock pulse from first synchronizing point information SP1.

Figure 5:
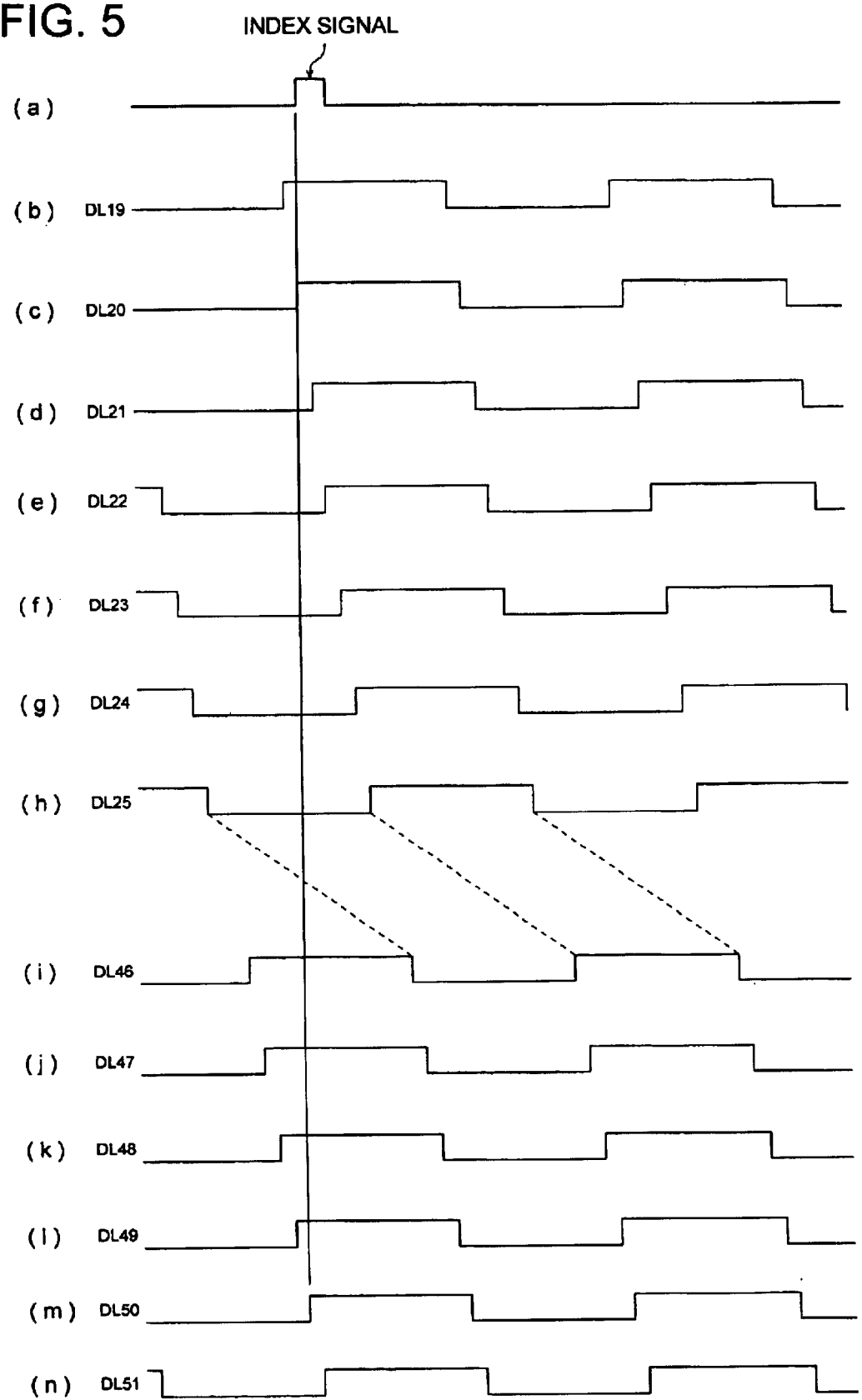
FIG. 5 shows a timing-chart for explaining an operating status of an image-forming apparatus embodied in the present invention.

Further, it is assume that SP1=20, and SP2=50 as shown in FIG. 5. In the drawing, there is indicated the state of synchronizing the DL20, the stage number of which is 20 (line (c) in FIG. 5), and the DL50, the stage number of which is 50 (line (m) in FIG. 5), with the rising-edge of the index signal.

Next, number of synchronized stages NS is derived from first synchronizing point information SP1 and second synchronizing point information SP2. Incidentally, number of synchronized stages NS indicates a number of delay element stages, which is equivalent to one period of the reference clock signals. In the above embodiment, since number of synchronized stages NS=SP2−SP1, it is derived that NS=30.

Further, delay time DT per one delay element stage is derived from number of synchronized stages NS and the period of the reference clock pulses. For example, when clock period TC of the reference clock pulses is 30 ns, DT=1 ns is derived from the equation DT=TC/NS by using NS=30. Since delay time DT per one delay element stage varies depending on the temperature condition of the integrated circuit, the fluctuation of the voltage of the power source supplied to the integrated circuit etc., it is possible that it becomes 1.5 ns in one case, and it becomes 0.5 ns in another case. However, since clock period TC of the reference clock pulses can be kept at constant, it is possible to precisely find delay time DT per one delay element stage under measuring operation by finding number of synchronized stages NS.

Still further, to generate proper image signals, correction count value CC, which indicates a number of delay element stages corresponding to the amount of time by which the phase of the dot clock pulse is to be shifted finally, will be found from frequency deviation information ER, the deviation direction information and delay time DT per one delay element stage. For this embodiment, correction count value CC=−6 is found from the values of ER=6 ns, the deviation direction information={−correction}, and DT=1 ns.

In order to generate proper image signals based on correction count value CC found in the above, it is necessary to advance the stage number of the delay elements by six stages before the end of the scan line. Concretely speaking, the delayed clock pulse, which is synchronized with the rising-edge of the index signal and outputted by the delay element of the 50th stage, is employed at first, and then, the delayed clock pulses, outputted by the delay elements of the 49th stage, 48th stage, 47th stage, 46th stage and 45th stage, are sequentially replaced and employed one by one while synchronizing with the select signal, and finally, the delayed clock pulses, outputted by the delay element of the 49th stage, will be employed.

Incidentally, when correction count value CC is larger than the number of synchronized stages, it is appropriate to circulate the select signal. In the above-described example, in the {−correction} case where SP1=20, SP2=50, and the number of synchronized stages is 30, at the timing when the select signal becomes 20, having been varied stepwise as 50, 49, —, 21, 20, it is appropriate to make it next 49, then to vary it stepwise to 48, —, because the upper rank select signal 20 and the upper rank select signal 50 are of the same phase. That is, the select signal is made to be 50, 49, —, 21, 20 (=50), 49, 48, —. In addition, in the same way also in the {+correction} case, the select signal may be circulated.

Further, in the case where the {−correction} is made in such a manner as to be varied stepwise every three stages like 50, 47, 43, —, 22, 19, it exceeds the SP1=20; then, next to 19, it is made to be 50−(20−19)−3=46. That is, by making it be in the state of being added by an amount exceeding the synchronizing point and one correction value for continuing to circulate, the circulation can be done without problem.

In selector 416 having received such the select signal as the above, the delayed clock pulses from the 50th stage, from the 49th stage, from the 48th stage, from the 47th stage,— are selected out of the delayed-signal group (S1 in FIG. 1) outputted from delay-chain section 413, and each of them is outputted as dot clock pulses (line (g) in FIG. 4).

In this case, by selecting the delayed clock pulses from the 50th stage, from the 49th stage, from the 48th stage, from the 47th stage,— out of the delayed-signal group (S1 in FIG. 1), the delayed clock pulse (the delayed clock pulse from the 50th stage) synchronized with the index signal is initially obtained, and the delayed clock pulses (from the 49th stage, from the 48h stage, from the 47th stage) of a little shorter delay (with an advanced phase) are sequentially obtained one after another within a single scanning line. As a result of the above operation, the contracting compensation, by which the expanded deviation in the main scanning direction is contracted so as to cancel it, is completed by performing the abovementioned {−correction}.

Further, in case of the {+correction}, with first synchronizing point information SP1 made to be the initial value, by selecting the delayed clock pulses from the 20th stage, from the 21st stage, from the 22nd stage, from the 23rd stage, —, out of the delayed-signal group (S1 in FIG. 1), the delayed clock pulse (from the 20th stage) synchronized with the index signal is initially obtained, and successively the delayed clock pulses (from the 21st stage, from the 22nd stage, from the 23rd stage,—) of a little longer delay (with a retarded phase) are sequentially obtained one after another within a single scanning line. As a result of the above operation, the expanding compensation, by which the contracted deviation in the main scanning direction is expanded so as to cancel it, is completed by performing the abovementioned {+correction}.

In other words, it becomes possible that, referring to the frequency deviation information, the number of pulses of a dot clock pulse in a single scanning line is adjusted at a predetermined number by shifting the delayed clock pulse to be used as the dot clock pulse successively every certain amount of time, and also the time period, during which the above-mentioned predetermined number of pulses are generated, is adjusted at a predetermined time.

Still further, in the abovementioned correcting operations, since the controlling operations are performed on the basis of frequency deviation information ER, the length of the image in respect to the main scanning direction can be accurately adjusted.

Figure 6:
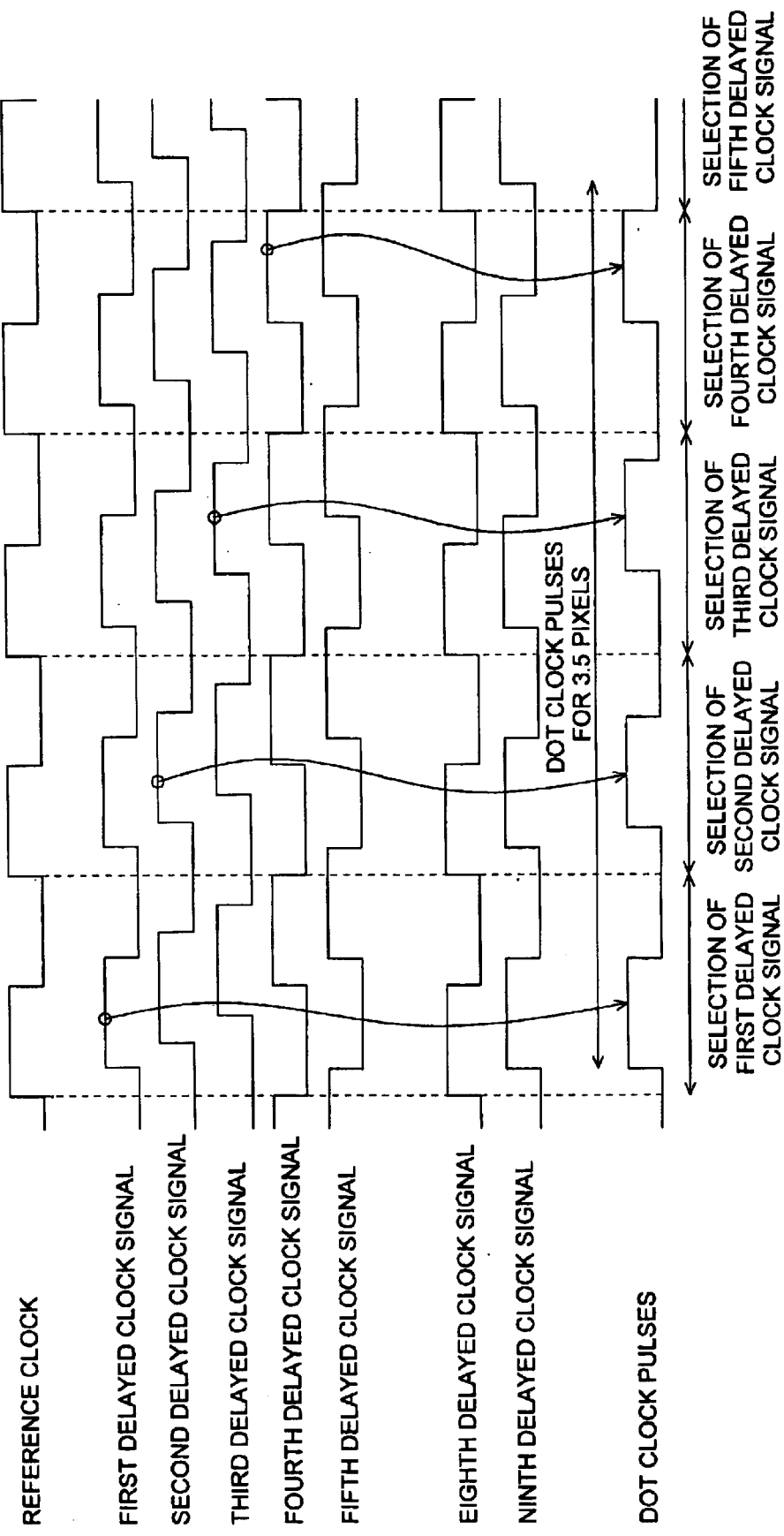
FIG. 6 shows a timing-chart for explaining an operating status of an image-forming apparatus embodied in the present invention.

Incidentally, FIG. 6 shows a timing chart of delayed clock pulses, illustrating a relationship between them in the expansion/contraction correction mode in the main scanning direction (namely, the main scanning magnification compensation). In FIG. 6, a reference clock, delayed clock signals (a first delayed clock signal to ninth delayed clock signal) and dot clock pulses are indicated.

In case shown in FIG. 6, when sequentially selecting the first delayed clock signal, the second delayed clock signal, the third delayed clock signal, the fourth delayed clock signal and the fifth delayed clock signal within four periods of the reference clock, 3.5 dot clock pulses reside within the four periods. In other words, since 3.5/4=87.5%, the controlling action is to actually lower the frequency of the dot clock pulses (as a result, the pulse width is widened) Incidentally, even if another selecting method is conducted, the same result as the above would be obtained.

Further, since the phase of the eighth delayed clock signal coincides with that of the reference clock in the case shown in FIG. 6, when sequentially selecting the eighth delayed clock signal, the seventh delayed clock signal, the sixth delayed clock signal, the fifth delayed clock signal and the fourth delayed clock signal within four periods of the reference clock, 4.5 dot clock pulses reside within the four periods (not shown in the drawings). In other words, since 4.5/4=112.5%, the controlling action is to actually raise the frequency of the dot clock pulses. Incidentally, even if another selecting method is conducted, the same result as the above would be obtained.

(Dot Clock Adjusting Operation in Digital Delay Method (2))

As aforementioned, the variation of the light intensity to be irradiated onto image-bearing member 1, caused by the changes of the reflectances and the transmittances, which occur depending on the shapes and arrangements of various kinds of lenses and filters included in the optical system, results in a quality deterioration of the image formed on image-bearing member 1, which is called as the unevenness of the scanning-light amount (the shading effect).

To overcome the above drawback, CPU 401 read out data in regard to the unevenness of scanning-light amount from table memory 402 in which the data are stored, and controls the selecting operation for a plurality of the delayed clock signals, performed in dot-clock adjusting section 410, so as to compensate the unevenness of scanning-light amount generated by the optical system in the optical writing section by increasing the light intensity at the portion where the scanning-light amount decreases.

Figure 7:
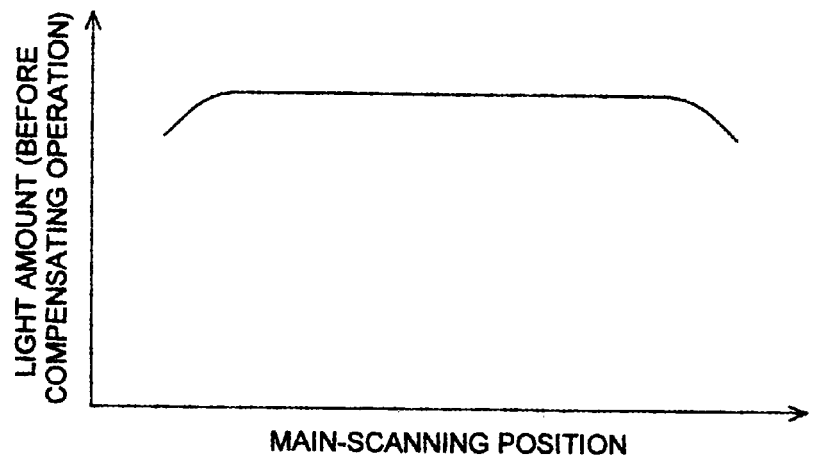
FIG. 7(a), FIG. 7(b) and FIG. 7(c) show graphs of the relationship between light-amount and main-scanning position, indicating states of compensating operation performed in an image-forming apparatus embodied in the present invention.
Figure 7:
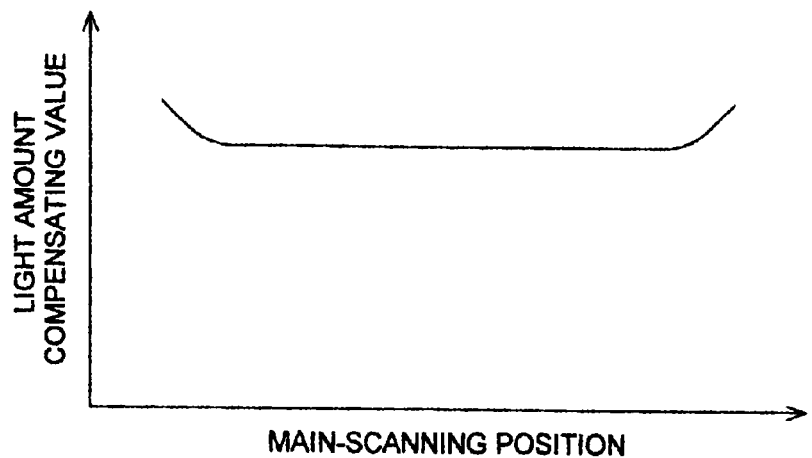
Figure 7:
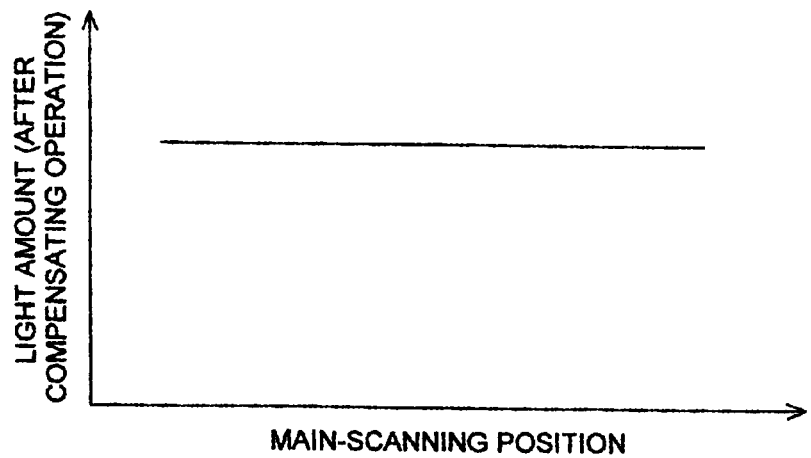

Incidentally, since the unevenness of scanning-light amount shown in FIG. 7(*a*) can be found in the designing stage or the manufacturing process of the apparatus concerned, the data (shown in FIG. 7(*b*)) for compensating such the unevenness of scanning-light amount can be calculated and stored in table memory 402 as default data in advance.

In other words, CPU 401 controls the selecting operation for a plurality of the delayed clock signals so as to change the positions of widths of the dot clock pulses (namely, pulse widths for driving the light-emitting element) toward a direction for canceling the unevenness of scanning-light amount. For this purpose, CPU 401 sends information of the unevenness of scanning-light amount to delayed-clock switching section 415 (S3 in FIG. 1). Concretely speaking, the light amount emitted by the light-emitting element is increased at a position where the light intensity decreases by widening the pulse widths for driving it, so as to cancel the unevenness of scanning-light amount.

For instance, at a certain position where the light intensity decreases due to the unevenness of scanning-light amount, the decrease of the light amount can be compensated by widening the pulse widths in response to the compensation values of the light-emitting amount stored in table memory 402. In the concrete example shown in FIG. 6, since 3.5 dot clock pulses reside within the four periods, the light amount will increase by 14%, compared to the case employing the reference clock pulses. Incidentally, in a real practice, the pulse widths should be gradually widened so as to compensate the decrease of the light amount.

As a result, in the clock generating circuit and the image-forming apparatus incorporating a polygon mirror in the optical writing system, it becomes possible to reduce the influence to the image quality, caused by the unevenness of scanning-light amount, without complicating its circuit configuration. Incidentally, since the pulse widths are widened to increase the light amount, the main-scanning length would be also extended to a certain extent. However, since the operation of widening the pulse widths is performed only at a portion where the light amount decreases, only little error of the main-scanning length would occur as a whole.

Accordingly, with respect to the manner of disposing the dustproof filter, it becomes possible to set an angle of mechanically attaching the dustproof filter at an optimum value without considering occurrences of the unevenness of scanning-light amount (the shading effect). Further, it also becomes possible to omit an expensive multi-coating treatment, which is applied onto each of the optical elements concerned in order to prevent them from generating the unevenness of scanning-light amount. Still further, since the unevenness of scanning-light amount can be suppressed without employing the PWM adjustment, the dynamic-range of the image-formation is not lowered.

Incidentally, when CPU 401 finds the unevenness of scanning-light amount while referring to the data stored in table memory 402, CPU 401 performs calculations on software and/or hardware to find them. Further, it is also applicable that, instead of performing calculations in CPU 401, another memory (not shown in the drawings), such as RAM, etc., is employed for enabling a table conversion method in the look up table format.

Further, it is desirable that the data of unevenness of scanning-light amount, which are detected at the time of final adjustment stage in the manufacturing process performed just before the image-forming apparatus concerned is shipped, are stored in table memory 402 as the default data. Otherwise, it is also applicable that the image-forming apparatus automatically forms a test pattern image under the controlling actions of CPU 401 after a predetermined time has elapsed or a predetermined number of copies has produced, and generates the data (for instance, numerical formulas) for compensation by detecting unevenness of scanning-light amount on the test pattern image, so as to store them in table memory 402. Incidentally, it is desirable that such the automatic generating-operation of the data for compensation as performed every predetermined time period should be conducted during the warm-up time or before the copy operation is commenced.

Further, according to the abovementioned embodiment, in the clock generating circuit and the image-forming apparatus incorporating a polygon mirror in the optical writing system, it becomes possible to reduce the influence to the image quality, caused by the unevenness of scanning-light amount, with a simple configuration of digital circuits excluding any analogue circuit.

As detailed in the above, the present invention can attain the following effects.

According to the configurations embodied in the present invention, to cancel the unevenness of scanning-light amount (the shading) at the surface of photoreceptor element, the period of each clock-pulse is slightly increased or reduced by changing a selection of a plurality of delayed clock pulses, which are generated by delaying clock-pulses outputted from a reference clock oscillator in slightly different delay times, based on the selecting signal sent from the delayed-clock switching section, which generates the selecting signal on the basis of the synchronizing point information outputted by the synchronized clock pulse detecting section and the information of unevenness of scanning-light amount stored in the table.

As a result, in the clock generating circuit and the image-forming apparatus incorporating a polygon mirror in the optical writing system, it becomes possible to reduce the influence to the image quality, caused by the unevenness of scanning-light amount, with a simple circuit configuration.

Further, according to the configurations embodied in the present invention, in the clock generating circuit and the image-forming apparatus incorporating a polygon mirror in the optical writing system, it becomes possible to reduce the influence to the image quality, caused by the unevenness of scanning-light amount, with a simple configuration of digital circuits excluding any analogue circuit.

Disclosed embodiment can be varied by a skilled person without departing from the spirit and scope of the invention.

What is claimed is:

1. A circuit for generating dot clock pulses for driving a light-emitting element employed in an optical-writing section of an image-forming apparatus, comprising:

a digital-delay dot clock adjusting section to adjust timings of rising-edges or falling-edges of said dot clock pulses generated by changing a selection for a plurality of delayed-clock pulses, which are generated by delaying clock-pulses, outputted from a reference oscillator, in slightly different delay times; and a controlling section to control a selecting operation for said plurality of delayed clock pulses, performed in said digital-delay dot clock adjusting section, so as to compensate for unevenness of scanning-light amount caused by an optical element employed in said optical-writing section.

2. A circuit for generating dot clock pulses for driving a light-emitting element employed in an optical-writing section of an image-forming apparatus, comprising:

an index sensor to detect a light-beam, which is emitted from said light-emitting element and is deflected for scanning by a light-scanning device employed in said optical-writing section, and to output an index signal when said index sensor detects said light-beam at an end portion of a main-scanning region scanned by said light-beam;

a delay-chain section to generate a plurality of delayed-clock pulses by delaying clock-pulses, outputted from a reference oscillator, in slightly different delay times;

a synchronized clock pulse detecting section to select synchronized delayed-clock pulses, which are synchronized with said index signal, out of said plurality of delayed clock pulses generated in said delay-chain section, and to output a number of delay-stages, which is derived from said synchronized delayed-clock pulses, as synchronizing information;

a table memory to store scanning-light unevenness information, which represents unevenness of scanning-light amounts caused by an optical element employed in said optical-writing section;

a delayed-clock switching section to generate a select signal, for selecting a specific delayed-clock pulse, having a phase suitable for compensating for said unevenness of scanning-light amount caused by said optical element employed in said optical-writing section, out of said plurality of delayed-clock pulses, based on said synchronized delayed-clock pulses and said synchronizing information outputted from said synchronized clock pulse detecting section and said scanning-light unevenness information stored in said table memory; and a selector to select said specific delayed-clock pulse out of said plurality of delayed-clock pulses in response to said select signal generated by said delayed-clock switching section.

3. The circuit of claim 2,
wherein said select signal is generated in said delayed-clock switching section by performing a calculating operation, based on said synchronized delayed-clock pulses outputted by said synchronized clock pulse detecting section and said scanning-light unevenness information stored in said table memory.

4. The circuit of claim 2,
wherein said select signal is generated in said delayed-clock switching section by performing a table-converting operation, based on said synchronized delayed-clock pulses outputted by synchronized clock pulse detecting section and said scanning-light unevenness information stored in said table memory.

5. The circuit of claim 2,
wherein said unevenness of scanning-light amount is a variation of light amount due to non-uniformity of reflectance and/or transmittance caused by said optical element.

6. The circuit of claim 2,
wherein said delay-chain section, said synchronized clock pulse detecting section, said table memory and said selector are digital circuits fabricated in an integrated circuit.

7. An image-forming apparatus, comprising:
an image-forming section that includes an optical-writing section to form an image; and
a circuit for generating dot clock pulses for driving a light-emitting element employed in said optical-writing section included in said image-forming section;
wherein said circuit includes,
a digital-delay dot clock adjusting section to adjust timings of rising-edges or falling-edges of said dot clock pulses generated by changing a selection for a plurality of delayed-clock pulses, which are generated by delaying clock-pulses, outputted from a reference oscillator, in slightly different delay times, and
a controlling section to control a selecting operation for said plurality of delayed clock pulses, performed in said digital-delay dot clock adjusting section, so as to compensate for unevenness of scanning-light amount caused by an optical element employed in said optical-writing section; and
wherein said image-forming section performs an image-forming operation based on clock signals outputted from said digital-delay dot clock adjusting section.

8. An image-forming apparatus, comprising:
an image-forming section that includes an optical-writing section to form an image; and
a circuit for generating dot clock pulses for driving a light-emitting element employed in said optical-writing section included in said image-forming section;
wherein said circuit includes:
an index sensor to detect a light-beam, which is emitted from said light-emitting element and is deflected for scanning by a light-scanning device employed in said optical-writing section, and to output an index signal when said index sensor detects said light-beam at an end portion of a main-scanning region scanned by said light-beam;
a delay-chain section to generate a plurality of delayed-clock pulses by delaying clock-pulses, outputted from a reference oscillator, in slightly different delay times;
a synchronized clock pulse detecting section to select synchronized delayed-clock pulses, which are synchronized with said index signal, out of said plurality of delayed clock pulses generated in said delay-chain section, and to output a number of delay-stages, which is derived from said synchronized delayed-clock pulses, as synchronizing information;
a table memory to store scanning-light unevenness information, which represents unevenness of scanning-light amounts caused by an optical element employed in said optical-writing section;
a delayed-clock switching section to generate a select signal, for selecting a specific delayed-clock pulse, having a phase suitable for compensating for said unevenness of scanning-light amount caused by said optical element employed in said optical-writing section, out of said plurality of delayed-clock pulses, based on said synchronized delayed-clock pulses and said synchronizing information outputted from said synchronized clock pulse detecting section and said scanning-light unevenness information stored in said table memory; and
a selector to select said specific delayed-clock pulse out of said plurality of delayed-clock pulses in response to said select signal generated by said delayed-clock switching section; and
wherein said image-forming section performs an image-forming operation based on clock signals outputted from said selector.

9. The image-forming apparatus of claim 8,
wherein said select signal is generated in said delayed-clock switching section by performing a calculating operation, based on said synchronized delayed-clock pulses outputted by said synchronized clock pulse detecting section and said scanning-light unevenness information stored in said table memory.

10. The image-forming apparatus of claim 8,
wherein said select signal is generated in said delayed-clock switching section by performing a table-converting operation, based on said synchronized delayed-clock pulses outputted by synchronized clock pulse detecting section and said scanning-light unevenness information stored in said table memory.

11. The image-forming apparatus of claim 8,
wherein said unevenness of scanning-light amount is a variation of light amount due to non-uniformity of reflectance and/or transmittance caused by said optical element.

12. The image-forming apparatus of claim 8,
wherein said delay-chain section, said synchronized clock pulse detecting section, said table memory and said selector are digital circuits fabricated in an integrated circuit.

* * * * *